US008626822B2

(12) United States Patent
Hiscock (10) Patent No.: US 8,626,822 B2
(45) Date of Patent: Jan. 7, 2014

(54) METHOD FOR IMPLEMENTING NETWORK RESOURCE ACCESS FUNCTIONS INTO SOFTWARE APPLICATIONS

(75) Inventor: James S. Hiscock, Rockport, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 12/199,929

(22) Filed: Aug. 28, 2008

(65) Prior Publication Data

US 2010/0057912 A1 Mar. 4, 2010

(51) Int. Cl.
*G06F 15/16* (2006.01)
(52) U.S. Cl.
USPC ............ 709/203; 709/217; 709/226; 709/229
(58) Field of Classification Search
USPC ......... 709/203, 220, 221, 222, 223, 224, 225, 709/226, 217, 229
See application file for complete search history.

(56) References Cited

U.S. PATENT DOCUMENTS

| | | | |
|---|---|---|---|
| 6,816,904 B1* | 11/2004 | Ludwig et al. ................ | 709/226 |
| 2007/0073805 A1* | 3/2007 | Jorgensen .................... | 709/203 |

FOREIGN PATENT DOCUMENTS

CN 101123528 A 2/2008

OTHER PUBLICATIONS

'Internet Access to a Home Area Network', Salf et al., Universtiy of Cambridge, Computer Laboratory, Feb. 2001.*
U.S. Appl. No. 12/120,377, James S. Hiscock.
English translation of Abstract from Chinese Patent Publication No. CN101123528A.

* cited by examiner

*Primary Examiner* — Liangche A Wang (57) ABSTRACT

An Open Network Adapter (ONA) provides an interface that provides network resource access functions to application writers and network users while hiding the implementation details from those writers and users. The ONA accepts high-level network resource access function requests and coordinates the lower-level actions necessary to accomplish the high-level requests. These network resource access requests may, for example, be provided via a user interface which may be implemented by a personal computer, telephone, or other device capable of providing a display and receiving user input.

20 Claims, 8 Drawing Sheets

METHOD FOR IMPLEMENTING NETWORK RESOURCE ACCESS FUNCTIONS INTO SOFTWARE APPLICATIONS

CROSS-REFERENCE TO RELATED APPLICATIONS

This application is related to and commonly-owned U.S. patent application Ser. No. 12/120,377, entitled "Open Network Connections," filed on May 14, 2008, which is hereby incorporated by reference herein.

FIELD

In general, embodiments of the present invention are directed to techniques for providing a set of network resource services that enable applications to be deployed in the network without the exposing the creator(s) of those applications to the implementation details of the underlying protocols (e.g., network, voice, video, storage), mechanisms, and devices. Moreover, new services may be provided using multiple underlying technologies.

BACKGROUND

The use of network resource access functions embedded in software applications to provide access to network features such as network traffic, voice, video, or network attached storage is increasing. Applications that embed these network resource functions vary and can include for example; push to talk web page features for customer support; automated doctor appointment reminders which leverage VoIP network resources; network traffic monitoring applications which utilize Open Network Connections (as described in U.S. patent application Ser. No. 12/120,377, entitled "Open Network Connections"); video applications, such as video capture, video storage, and stored video search and replay; and storing, searching, and retrieving data from network attached storage devices. Programmers who write these software applications typically have skill in writing one type of software application, but not in writing multiple applications for use with multiple types of protocols (e.g., telephony, network, video, and network attached storage protocols). As a result, the programmer of ordinary skill who attempts to write a software application which utilizes multiple protocols will have great difficulty doing so and may find the task impossible.

Therefore, there is a need to simplify the process of creating network applications which require the use of multiple network protocols and/or multiple types of network devices.

SUMMARY

Embodiments of the present invention are directed to an Open Network Adapter (ONA) which provides an interface that provides network resource access functions to application writers and network users while hiding the implementation details from those writers and users. The ONA accepts high-level network resource access function requests and coordinates the lower-level actions necessary to accomplish the high-level requests. These network resource access requests may, for example, be provided via a user interface which may be implemented by a PC, telephone, or other device capable of providing a display and receiving user input.

In common software application deployments, implementations utilize multiple sites that are located at different locations. These sites range in size from a small network where there are only a few employees and minimal network service device capabilities to a large corporate network, such as corporate headquarters with many employees and with very capable and possibly redundant sets of network resource devices. Embodiments of the present invention not only translate high-level network resource access function requests into lower level actions necessary to accomplish the high-level requests, but also hide details of the location(s) at which lower level-actions are executed. This simplifies the job of the software application programmer by relieving the programmer of the need to interact with low-level implementation details.

The ONA may be layered, with the highest-level layer interfacing with software applications and/or network users. When the ONA receives a request, each layer of the ONA may break the receive request into one or more lower-level requests for a network resource, service action, or device action, and decide where to direct the lower-level requests or actions.

Embodiments of the invention may provide network resource access to users and/or software using servers and devices that service network resource access requests using either a single technology or multiple technologies. The system provides a method for offering new services using a Miscellaneous Plug-ins Server to provide a linkage to other services (such as email and room reservation services) or to provide hosting for a new multi-technology service before providing that service with the Network Resource Services Server, when it becomes a mainstream service.

For example, one embodiment of the present invention is directed to a computer-implemented system for providing network resource functions within a software application. The system includes network function translation software, which includes means for receiving a request to perform a network function; means for identifying a plurality of network services for performing the network function; and means for issuing a plurality of network service requests to at least one network service server to perform the plurality of network services. The system also includes the at least one network service server. The at least one network service server includes means for receiving the plurality of network service requests and, for each of the plurality of network service requests: means for identifying at least one device to satisfy the network service request; and means for requesting that the at least one device perform at least one action to satisfy the network service request.

Another embodiment of the present invention is directed to a computer-implemented method comprising: (A) receiving a request to perform a network resource access function; (B) selecting a subset of a first plurality of devices, the first plurality of devices including devices of at least one of the following types: network traffic monitoring devices, voice services devices, video resource devices, and network attached storage devices; (C) identifying a plurality of actions to be performed by the device subset to satisfy the request; and (D) issuing requests to the device subset to perform the plurality of actions.

Other features of the present invention will become apparent from the following detailed description taken in conjunction with the accompanying drawings.

DETAILED DESCRIPTION

Figure 1:
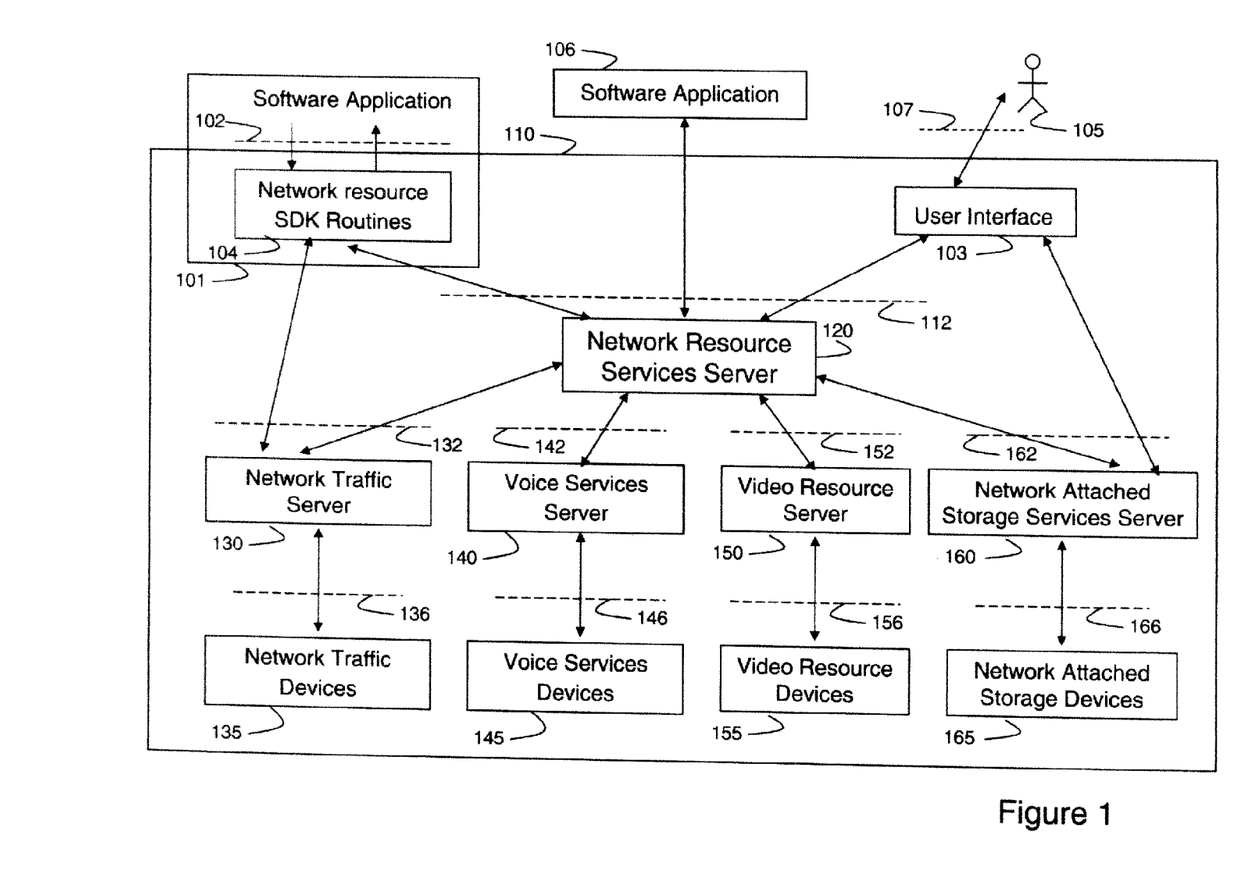
FIG. 1 depicts the types of interfaces provided, Programming Interface (API) providing software function calls for Applications to a Network resource Software Development Kit (SDK), Network Interface Open Network Services Language protocol access to popular network related functions, and a User Interface to support Open Network Commands.

Referring to FIG. 1, an Open Network Adapter (ONA) 110, the ONA's interfaces to applications and network users, and the ONA's building blocks are shown. The ONA 110 provides three types of interfaces: two types to application software and one type to network users. The first type of interface is an Application Programming Interface (API) 102 that provides application software with network resource access function calls, which provide access to network traffic, video, voice, and network-attached storage capabilities. The API 102 may be used by a software application 101, which includes a network resource services Software Developers Kit (SDK) 104. The software application 101 communicates with the SDK using the API 102.

The SDK 104 is software provided to the software application developer and is linked in or otherwise associated with the code of the application 101 that is created by the developer of the application 101. Incorporation of the SDK 104 into the application 101 enables network resource access services to be incorporated into the application 101. The API 102 may, for example, be published as a Web Service, in the form of a 'WSDL' document. This document may serve as the programmatic interface via which the author of the application 101 may integrate the application 101 with network resource system components. The API 102 may be platform neutral (e.g., XML based) and may be programming language agnostic, which allows for integration across legacy and newer applications.

The second type of interface provided by the ONA 110 is an Open Network Services protocol interface 112. Applications which communicate with the ONA 110 using the protocol interface 112 do not need to incorporate the SDK 104 into the application itself. For example, using protocols such as SOAP, XML, and HTTPS/SSL, an application 106 passes a network resource request to a Network Resources Services Server 120 in the Open Network Adapter 110 to access popular network related functions such as network traffic, video, voice, and network attached storage functions.

The third type of user interface 107 to the Open Network Adapter 110 is a User Interface 103, which may be part of the Open Network Adapter 110. The User Interface 103 may receive Open Network Commands issued by a user 105 and translate those commands into network resource access requests to provide the user 105 with access to network resources.

The Network Resource Services Server 120 translates high-level network resource access requests (such as those issued by the software application 101, the software application 106, and the user 105) into implementation-specific protocols via the Network Traffic server interface 132, Voice Services server interface 142, Video Resource server interface 152, and Network Attached Storage server interface 162. The Network Resource Services Server 120 may also track the operational state, load, location, and possibly other parameters of technology specific service servers and direct the technology specific request to a selected server or set of servers.

Note that some or all of the functionality of the Network Resource Services Server 120 may be incorporated into the SDK 104 and/or User Interface 103. Therefore, descriptions herein of functions performed by the Network Resource Services Server 120 may also be applied to the SDK 104 and/or user interface. Furthermore, the SDK 104 and/or user interface 103 may communicate with servers 130, 140, 150, 160 either through the Network Resource Services Server 120, or directly through interfaces 132, 142, 152, and 162, respectively.

The Network Traffic Server 130 translates network traffic-specific function requests into one or more device actions (e.g. requesting an ONC) via the interface 136 between the Network Traffic Server 130 and the Network Traffic Devices 135 (e.g., an IPS which provides the TAP function (see U.S. patent application Ser. No. 12/120,377, entitled "Open Network Connections," filed on May 14, 2008). The Network Traffic Server 130 also makes the determination of which devices to utilize to perform the technology-specific request. Factors such as location, load, and operational state may be used to select the device or devices to perform the needed actions. Examples of network traffic devices include, but are not limited to, Switches, Routers, IPSs, and other devices that can perform network traffic access services.

The Voice Services Server 140 translates the voice-specific function requests into one or more actions (e.g., place a voice call) via the interface 146 between the Voice Services Server 140 and the Voice Services Devices 145 (e.g., a Call Processor). The Voice Services Server 140 also makes the determination of which devices to utilize to perform the technology-specific request. Factors such as location, load, cost, and operational state may be used to select the device or devices to perform the needed actions. Examples of Voice Service devices include, but are not limited to, call processors, IP Phones, VoIP gateways, and other devices that can perform Voice Services.

The Video Resource Server 150 translates the Video-specific function requests into one or more actions (e.g., start video capture) via the interface 156 between the Video Resource Server 150 and the Video Resource Devices 155 (e.g., a network attached video controller). The Video Resource Server 150 also makes the determination of which devices or devices to utilize to perform the technology specific request. Factors such as location, load, local authority and operational state may be used to select the device to perform the needed actions. Examples of Video Resource devices include, but are not limited to, video conference bridges, video cameras, surveillance systems, and other devices that can perform Video Resource services.

The Network Attached Storage Server 160 translates the network attached storage-specific function request into one or more actions (e.g., store the video feed in a specific file) via the interface 166 between the Network Attached Storage Server 160 and the Network Attached Storage Devices 165 (e.g., a Storage Area Network (SAN) controller). The Network Attached Storage Server 160 also makes the determination of which devices or devices to utilize to perform the technology specific request. Factors such as location, capacity, security and operational state may be used to select the device to perform the needed actions. Examples of Network Attached Storage devices include, but are not limited to, NAS devices, SAN devices, and other devices that can perform Network Attached Storage services.

Figure 2:
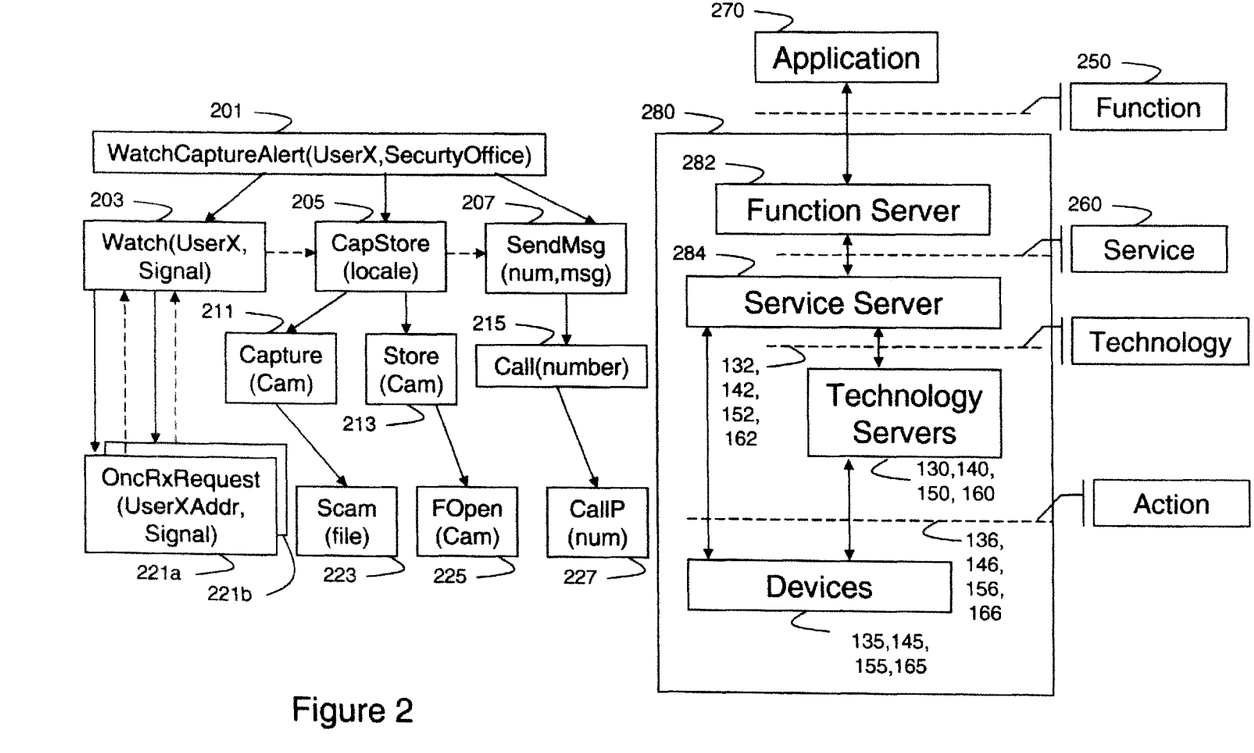
FIG. 2 depicts the interfaces between the components of an Open Network Adapter. The components are organized in levels the highest level being the network resource access function server and the lowest level are the network attached devices. An example high level network resource access request and the resultant lower level service request or device actions is shown in relation to the Network Function, Network Server, Network Technology, and Network Device levels.

Referring to FIG. 2, the external function interface 250 between an Application 270 and the Open Network Adapter 280 and the internal interfaces between the components of an Open Network Adapter 280 are shown. The Application 270 in FIG. 2 may, for example, be the application 101 or the application 106 shown in FIG. 1. Similarly, the Open Network Adapter 280 shown in FIG. 2 may be the Open Network Adapter shown in FIG. 1.

The components of the Open Network Adapter 280 shown in FIG. 2 are organized in levels, with the highest level being the network resource access Function Server 282 and the lowest level being the network attached devices 288. The interface 250 presented to Application 270 provides various network resource access functions. The functions provided at the level of interface 250 may utilize one type of network technology such as network traffic, video, voice, or network attached storage; or may provide a function that utilizes multiple different network technologies such as a WatchCaptureAlert( ) function 201, which is shown in FIG. 2 as an example to illustrate the operation of Open Network Adapter 280. The function WatchCaptureAlert( ) 201 watches for a specified user with a specified network address attempt to connect to a network, and when found: a video capture is started, the video is stored on a network attached storage device, and a phone call is placed to security personnel alerting them that the specified user has attempted to connect to the network and notifying the security personnel where to find the captured video.

The Open Network Adapter 280 illustrated in FIG. 2 enables implementation details to be hidden at multiple different layers, leveraging building blocks at each level, and providing powerful functions which are formed by utilizing one or more functions from the level below. In effect a network resource access language is created and, as with a computer programming language, such a language is implemented in levels, each of which hides the implementation details of the level below it. This enables powerful high-level functions to be specified without requiring the person who specifies those functions to understand how those functions are implemented at lower levels.

A Function Server 282 receives the network resource access function requests and determines which network services could be utilized to provide those function requests. The Function Server 282 also determines which service server or servers to call upon to provide the needed service. In the example shown in FIG. 2, the Function Server 282 (as implemented, for example, in the SDK software 104) receives this network function request WatchCaptureAlert(UserX,SecurityOffice) 201 and breaks it into three service requests 203, 205, and 207. The network traffic service request Watch (UserX,Signal) 203 requests the network to look for traffic from UserX and also to look for UserX trying to connect to the network and return Signal, which indicates where in the network UserX is connected or attempted to connect.

Figure 3:
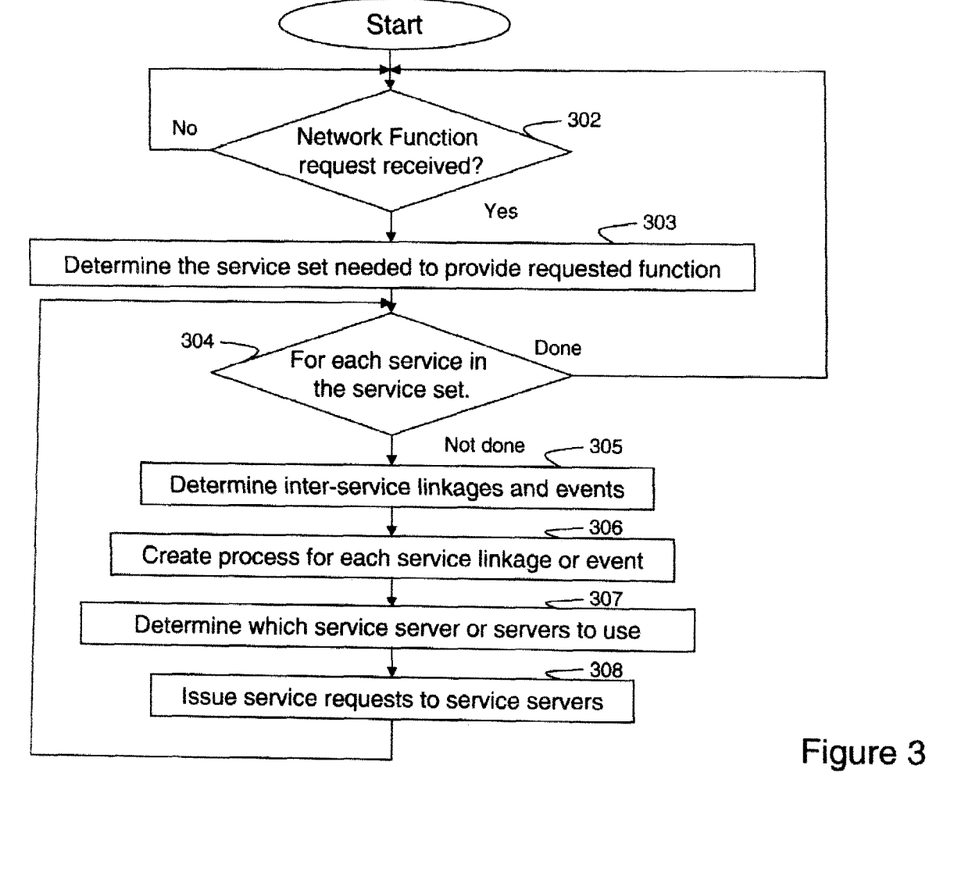
FIG. 3 is a flow chart that depicts the Network Function Server logic.

FIG. 3 shows how the function server 282 handles a network resource access function request in one embodiment of the present invention. The Function Server 282 awaits a network resource access function request at step 302. When a function request is received, the function server 282 determines which service set is needed to provide the requested function at step 303. For each service in the service set; the inter-service linkages and events that need to be handled for this service are determined at step 305; a process is created to handle each linkage and event at step 306; the service server or service servers to carry out the service request is chosen by considering factors such as location, load, and operational state; and one or more service requests are issued to the selected server(s) at step 308. Once all the service requests are issued, the function server 282 returns to step 302, where it waits for another function request. The processes that were created (not shown) will be invoked when the associated events occur and when inter-service linkages are used.

In this example, the event "Signal" caused a process to be created to handle this event. This process (not shown), created by the Function Server 282, is an example of an "inter-service linkage" which will wait for Signal to be returned (an example of an "inter-service event"). When and when this event occurs, the process created by the Function Server 282 will request a video service server to capture video in the area of the where UserX is attempting to connect to the network. The video service request CapStore(locale) 205 instructs the network to capture in the area indicated by the variable "locale' and store video on a network attached storage device. Also, the process created by the Function Server 282 will, upon receiving the Signal indication, request a voice service SendMsg(num,msg) 207 which requests that a voice call be made to security with a message alerting security that UserX is attempting connect to the network and that the video feed can be found at a specified location.

Returning to FIG. 2, the Service Server 284 receives network service requests from, in this example, the Function Server 282 via the Service interface 260. A Service Server 284 receives the network service requests and determines which technology services or types of devices could be utilized to provide the network service. The Service Server 284 also determines which specific service server/device or servers/devices to call upon to provide the needed network service. In this example the Service Server 284 (which may, for example, be implemented in a network appliance) receives three service requests in a service set: Watch(UserX, Signal) 203, CapStore(locale) 205, and SendMsg(num,msg) 207.

The network service server 284 breaks Watch(UserX, Signal) into multiple requests for an Open Network Connection (ONC) receive connection (221*a*, 211*b*, etc.) to various Traffic Access Providers (TAPs) in the network to watch for traffic from UserX. Although not shown in FIG. 2, the Services Server 284 could also request notification from the Network Access Control (NAC) system for network login attempts from UserX. The network service server 284 breaks CapStore (locale) 205 into technology service requests to start a video capture (Capture(locale) 211) and a technology service request to store the video on a network attached storage device (Store(Cam) 213). The results of the two related technology services are to capture and store video from the area where UserX attempted to connect to the network.

Figure 4:
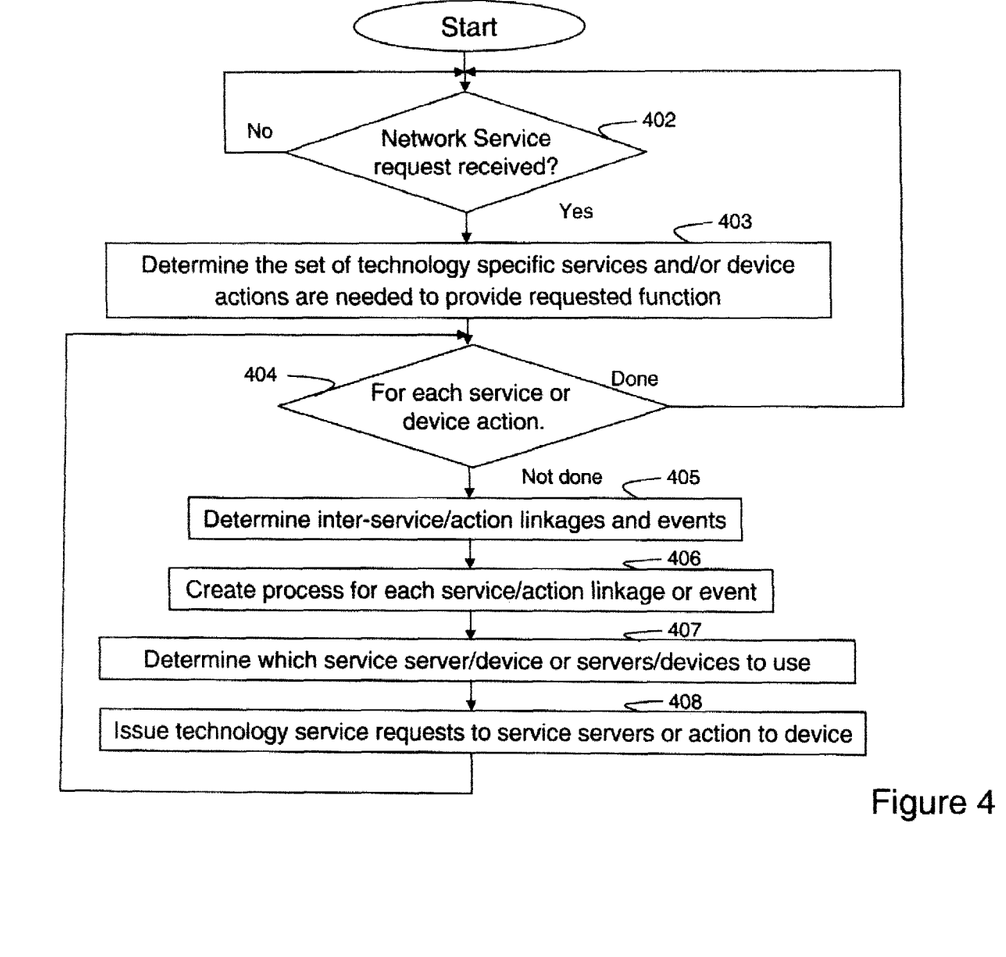
FIG. 4 is a flow chart that depicts the Network Service Server logic.

FIG. 4 shows how the network service server 284 handles network service requests according to one embodiment of the present invention. The Service Server 284 awaits a network service request at step 402. When a service request is received, the service server 284 determines which technology services and device actions are needed to provide requested service at step 403. For each technology service or device action needed; the inter-service/action linkages and events that need to be handled for this service/action are determined at step 405; a process is created to handle each linkage and event at step 406; the technology service server/device or service servers/devices to carry out the service request are chosen by considering factors such as location, load, and operational state; and the service/action request is issued to the selected server/device or servers/devices at step 408. Once all the service/action requests are issued, the service server 284 goes back to step 402, where it waits for another network service request. The processes that were created (not shown) will be invoked when associated events occur and when inter-service linkages are used.

Returning to FIG. 2, the Technology Servers 130, 140, 150, 160 receive network service requests from, in this example, the Services Server 284 via the technology specific interfaces 132, 142, 152, 162. Technology Servers 130, 140, 150, 160 receive the network service requests and determine which types of devices could be utilized to provide the technology specific service. The Technology Servers 130, 140, 150, 160 also determine which specific device or devices to call upon to provide the needed technology specific network service. In this example the Technology Servers receive three technology requests, Capture(Cam) 211, Store(Cam) 213, and Call (number) 215. The Video Technology server 150 receives the Capture(Cam) 211 request and issues a SCam(file) 223 to start a camera 155 capturing a video and to send the video stream to a file named "file". The Network Attached Storage server 160 receives the Store(CAM) 213 request and issues a FOpen(CAM) 225 device action, informing a network attached storage device 165 that the video stream should be captured and stored. The Voice Technology Server 140 receives the request Call(number) 215 and issues a device action CallIP(num) 227 to a voice device (call processor) 145 to make a voice call to telephone "num" informing the security personnel that UserX is attempting to connect to the network and that the video stream can be found at a well-known location on network attached storage.

Figure 5:
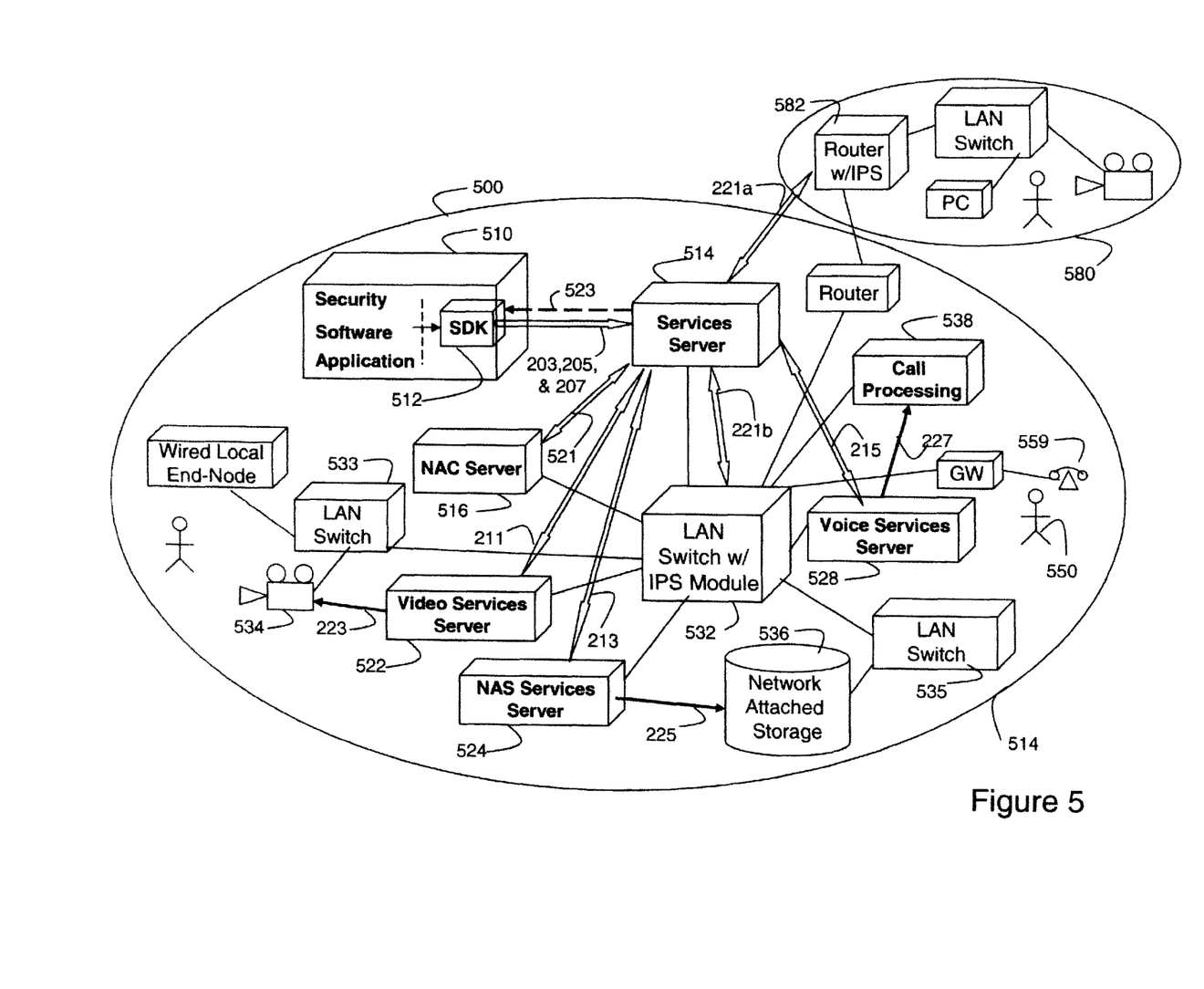
FIG. 5 shows a Network with a home site and a remote site implementing an example containing a Software Application, a SDK implementing the Network Function layer, a Network Service Server, Voice technology server, Video technology server, NAS technology server, and other network devices.

Referring to FIG. 5, a security application that utilizes network traffic, voice, video, and network attached storage network resource access functions is described as an example of how application developers can utilize embodiments of the present invention. This security application is used to locate an identified end node or user attempting to connect to a network, alert security personnel of the whereabouts of the end node or user with a phone call, capture video of the end node or user, and store the video for later use. The security software application 510 has incorporated an SDK 512 that provides Network Resource Services Server function. The security software application 510 issues a WatchCaptureAlert (UserX,SecurityOffice) request to the SDK 512 via the API. The security application uses the network traffic resource access function (in this example within the SDK 512) to request that when network traffic to or from a specified device address is discovered, an alert should be sent to the application indicating the presence of this network traffic and indicating where in the network this specified device is connected or is attempting to connect.

The SDK 512 breaks the WatchCaptureAlert(UserX,SecurityOffice) request into three requests 203, 205, and 207 to issue to the network Services Server 514. The network Services Server 514 receives the request Watch(UserX,Signal) 203, which requests the network to look for traffic from UserX and also look for UserX trying to connect to the network and return Signal, which indicates where in the network UserX is connected or attempted to connect. The SDK 512 also creates a process to handle the event of Signal being returned indicating UserX has attempted to connect to the network. The network Services Server 514 issues device actions in the form of OncRxRequests to IPS devices in the network that provide TAP functionality. In this example the OncRxRequests 221a & 221b are sent to the router with IPS 582 at remote LAN 580, and to LAN Switch with IPS 532. The network Services Server 514 also sends a device action 521 to the NAC Server 516 requesting to be notified if UserX attempts to connect to the network.

Once the SDK receives the Signal 523, that UserX has attempted to connect to the network, the request CapStore (locale) 205 is issued to the Services Server 514. The Services Server 514 breaks that request into two requests Capture (Cam) 211 to the Video Services Server 522 and Store(Cam) 213 to the Network Attached Storage (NAS) Services Server 524. The Video Services Server 522 receives the Capture (Cam) 211 request and fulfills the request by issuing SCam (file) 223 device action to the network attached camera 534 to start capture video and send the captured video to a specified file. The Video Services Server 522 also receives the Store (Cam) 213 request and fulfills this request by issuing a FOpen (cam) device action 225 to the network attached storage device 536 instructing the device to except the video stream and store it in a specified file.

Also upon receiving the Signal 523, indicating that UserX has attempted to connect to the network, the request SendMsg (num,msg) 207 is sent to the network Services Server 514. The network Services Server 514 breaks that request into a single request Call(number) 215, which is sent to the Voice Services Server 528. The Voice Services Server 528 receives the request Call(number) and issues a device action CallIP (num) 227 to a Call Processor 538 to make a voice call to telephone "num" informing the security personnel that UserX is attempting to connected to the network and the video stream can be found at a well known location on network attached storage.

FIG. 1 depicted a User Interface 107 that presented network resource access functions to the User 105. The User 105 could be a person that has responsibility for operating the network, part of the network, and/or resources attached to the network. The User 105 may alternatively be a person who wants access to a network-accessible resource. The software that implements the user interface 103 is part of the Open Network Adapter and translates user input to network resource access requests. This User Interface software 103 may, for example, run on a user's personal computer as a downloaded application or applet; run as a server that provides a web page that provides the various user-accessible network resource commands; could run on a wired or wireless network phone; or run on any network appliance device. The commands provided to a user that has responsibility for operating the network or part thereof would be different commands from those issued by a user who only wants access to a network accessible resources.

Figure 6:
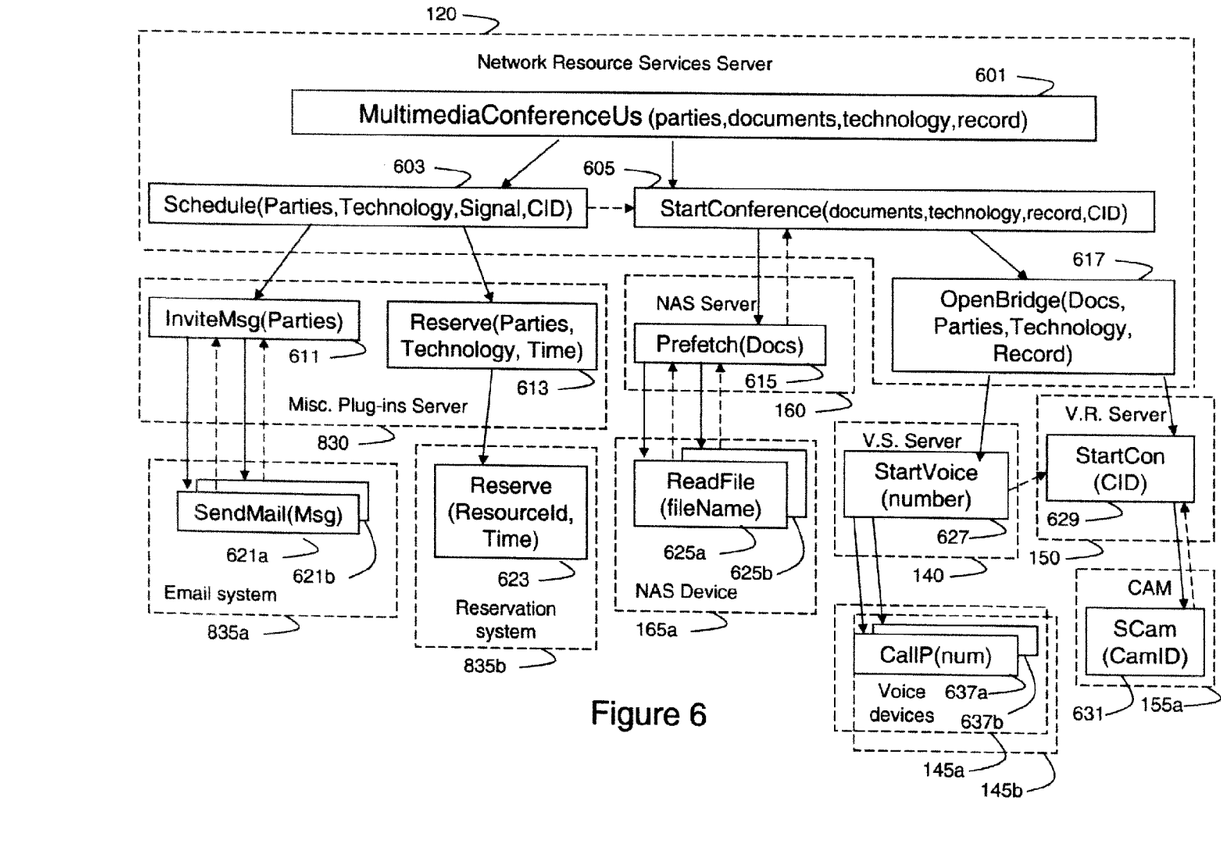
FIG. 6 depicts the call tree of the MultimediaConferenceUs service and the device overlay where each action or service is implemented.
Figure 7:
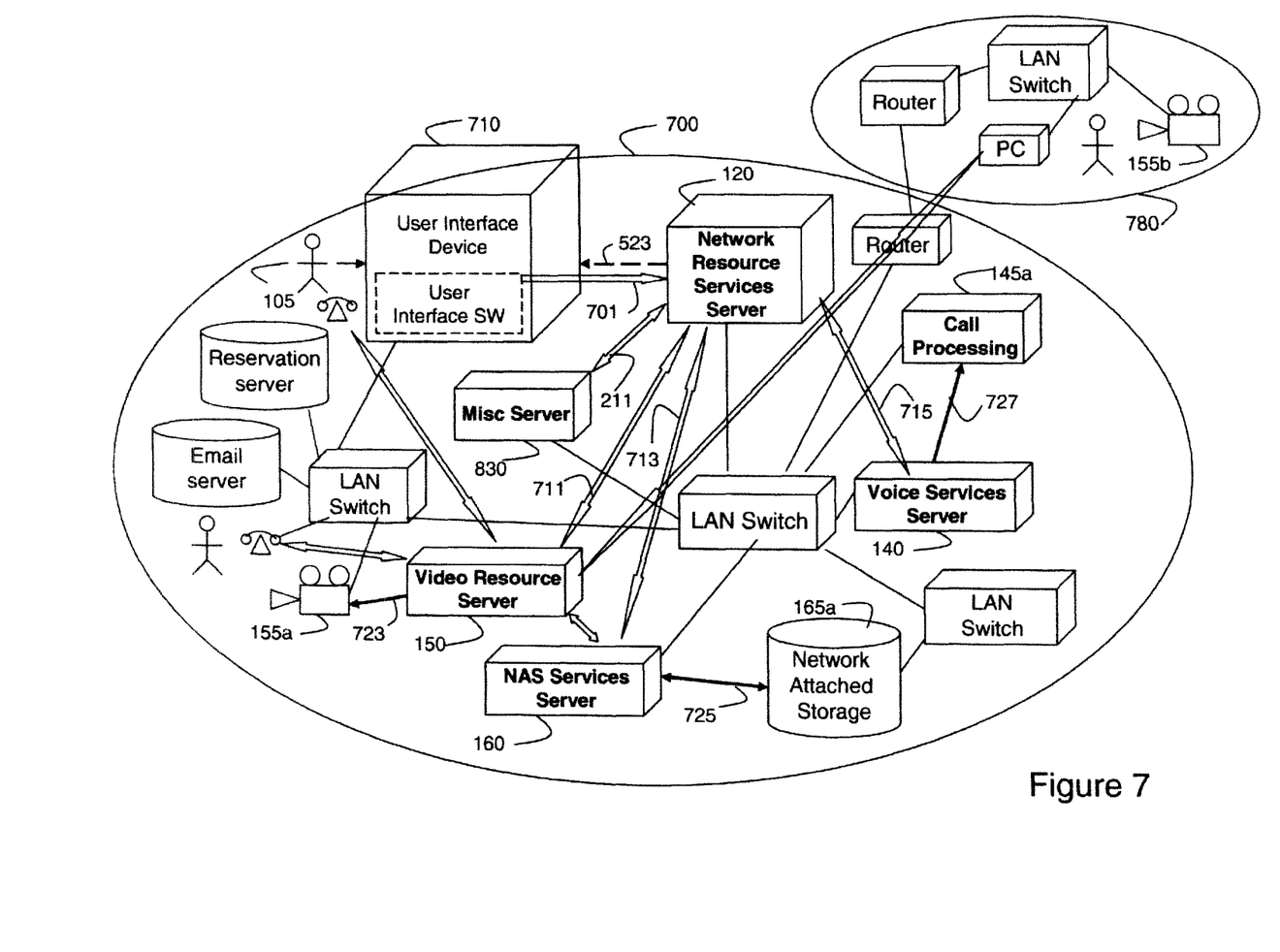
FIG. 7 depicts the network topology and associated devices and users of the example implementation of the user interface accessible network resource service MultimediaConferenceUs.
Figure 8:
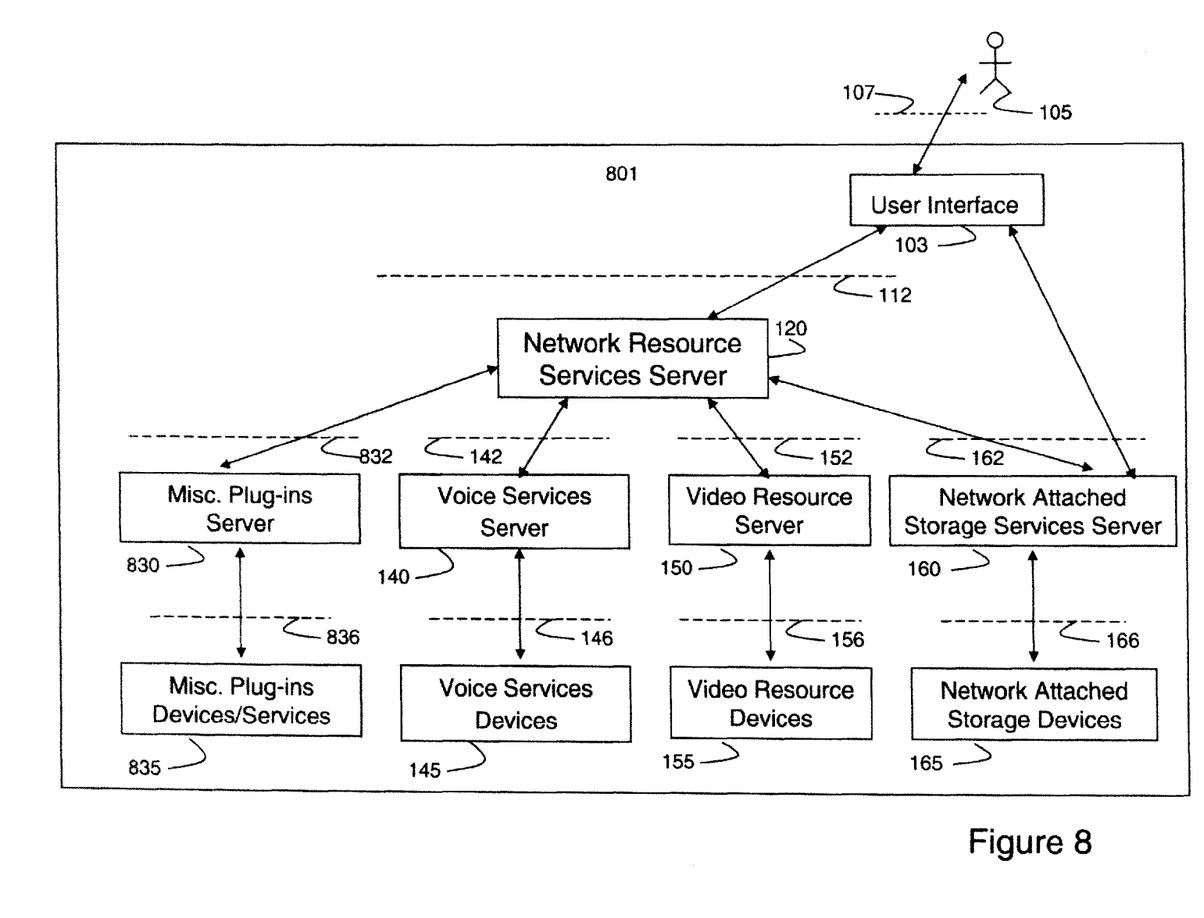
FIG. 8 depicts the interfaces, servers, and devices provided to implement a User Interface to provide the MultimediaConferenceUs Open Network Command.

Now referring to FIGS. 6, 7, and 8, an example of a user interface implemented according to one embodiment of the present invention is disclosed. FIG. 8 depicts an Open Network Adapter 801, the User 105, and the user interface 107 to the User Interface software 103. The User Interface software 103 presents a display and a menu or buttons to take user input and convey information to the user 105. In FIG. 7 an example of the User Interface Device 710 is shown which can be a PC, telephone, or other device with input and output capabilities. The MultimediaConferenceUs function is invoked by the User 105 to schedule a multimedia conference with a set of participants and a set of documents needed for the conference. The meeting is to be recorded and stored. The multimedia conference request, the list of participants, and the documents needed are input to the User Input Device 710 by the user 105 and passed to the Network Resources Services Server 120 in the form of a call 701 to the MultimediaConferenceUs function. The Network Resources Services Server 120 issues service requests to the Misc. Plug-ins Server 830, the Voice Service Server 140, the Video Resource Server 150, and the Network Attached Storage Server 160 to accomplish the task of providing the service requested by the User 105.

FIG. 6 shows the MultimediaConferenceUs function 601, which in turn calls the function Schedule 603 (to send out invitations and schedule the meeting rooms or any other equipment required by this multimedia conference) and StartConference 605 (to start the conference at the scheduled time with the defined participants and the required equipment and specified locations). MultimediaConferenceUs 601, Schedule 603, and StartConference 605 all run on the Network Resource Services Server 120 as indicated by the dotted lines.

Schedule 603 calls InviteMsg 611 with the list of participants to whom invitation messages should be send. InviteMsg 611 issues multiple SendMail requests 621*a*, 621*b*, etc. to invite the individuals on the participant list or sends a single invite message to all or a subset of the participant list. Optionally InviteMsg 611 could also handle responses from the participants and update the actual participant list, which can be utilized by StartConference 605 when the conference is to start. InviteMsg 611 is a service provided by the Misc. Plug-ins Server 830 and provides a linkage to the Email system. The Misc. Plug-ins Server 830 is used to host plug-in services that provide a linkage to other services (email, room reservation, etc.) or to provide hosting for a new multi-technology service before providing that service with the Network Resource Services Server, when it becomes a mainstream service.

Schedule 603 also calls Reserve 613 to reserve the required equipment and specified locations required for the conference at the specified time. Reserve 613 is a service that runs on the Misc. Plug-ins Server 830 and provides a linkage to the room and resource reservation system 835*b*. Optionally Reserve 613 can reserve equipment and locations based on the parties involved and associated conference related preferences in each of the parties profiles. Each of the participants (parties) may have profile information that specifies conference preferences such as nearby conference rooms, video or audio equipment preferences, audio of video access numbers, or even travel information about the participants that may change the preference based on time of the conference and the participants travel schedule.

At this point the conference is scheduled and the resources have been reserved. Prior to start of the conference the Schedule 603 function signals the Start Conference 605 function that conference with Conference ID (CID) needs to start. The Start Conference 605 function upon receipt of the signal from the Schedule 603 function pre-fetches the files needed for the meeting, such as PowerPoint presentation files, spreadsheet files, picture files, of other files that can be shared by two or more of the participants. The pre-fetch is accomplished by a call to the Prefetch function 615, which is running on the Network Attached Storage Server 160, with a list of documents needed.

The requested files are obtained by the Prefetch function 615 by ReadFile function 625*a*, 625*b*, etc. requests to the Network Attached Storage (NAS) device 165*a*. The retrieved files are passed back to the StartConference function 605 from the Prefetch function 615. The StartConference function 605 then calls the OpenBridge function 617, indicating that a conference needs to start using a specified or provided set of documents, with a list of participants, using specified equipment, at specified locations, and that the conference is to be recorded. The OpenBridge function 617 is shown as running on the Network Resource Services Server 120 but may have initially been deployed on the Misc. Plug-ins Server 830.

The OpenBridge function 617 calls the StartVoice function 627 which either calls a voice conference number and enters the dial-in information (such as a conference ID or password) or calls the participants so that they do not have to remember to call into a conference number. The StartVoice function 627 runs on the Voice Services Server 140. One or more calls are placed using the CallIP function 637*a*, 637*b*, etc. which runs on a call processor or phone device 145*a*, 145*b*, etc. The resulting voice feed is either passed from the StartVoice function 627 to the StartCon function 629, or the StartCon function 629 can access the voice bridge directly.

The OpenBridge function 617 then calls the StartCon function 629 which is running on the Video Resource Server 150. The StartCon function 629 issues a request to start the video recording at the locations as needed and adds the video feed into a multi-media bridge that distributes the voice and video and controls which device supplies the video shared by the group of participants. The video could be supplied by a camera or a document display or a mixture of sources. The request is sent by issuing a call to the SCam function 631 running on the CAM device 155*a*.

Referring now to FIG. 7, as described previously, the User 105 has scheduled the conference using the User Interface Device 710 and now it is time for the conference to start. The Schedule 603 function signals the Start Conference 605 function that a conference with Conference ID (CID) needs to start, both of which are running on the Network Resource Services Server 120. The Start Conference 605 function calls the Prefetch function 615, indicated by arrow 713, with a list of documents that need to be pre-fetched for the conference. The Prefetch function 615 runs on the NAS Server 160. The requested files are obtained by requests 725 to the Network Attached Storage (NAS) device 165*a*.

The StartConference function 605 then calls the OpenBridge function 617, both running on the Network Resource Services Server 120, indicating that a conference needs to start. The OpenBridge function 617 calls 715 the StartVoice function 627, running on the Voice Services Server 140. The StartVoice function 627 sets up a voice conference by calling CallIP, which is running on the Call Process device 145*a*.

Then the conference is started when the OpenBridge function 617 running on the Network Resource Services Server 120 calls 711 the StartCon function 629 running on the Video Resource Server 150. The StartCon function 629 sends a request by issuing a call 723 to the SCam function 631 running on the CAM device 155*a*. Although a request could be sent to CAM device 155*b* at remote location 780, this is not shown in FIG. 7 for ease of illustration.

The Voice feeds, the video feeds, and the document display are all set to the Video Resource Server 150, which distributes the voice and video to the participants as indicated by three unlabeled arrows. The conference may also be recorded while it occurs and stored to the Network Attached Storage device 165*a* through the NAS Services Server 160.

The WatchCaptureAlert command, explained in detail above, could also be offered as a user interface command provided to users that have responsibilities of the operation of the network or part thereof some times called network administrators.

The embodiments described above are merely examples of services that may be provided by embodiments of the present invention. Other examples of commands that may be provided to users who want access to network accessible resources include, but are not limited to:

FindAndShowPrinter—Find the nearest printer and show a video of what that printer looks like, could also show a printer tutorial on that printer's operation.

MultimediaConferenceUs—Invite a list of participants, access the required documents, initiate multimedia conference using the specified technology, and optionally store a log of the conference.

While only a few illustrative embodiments of the present invention have been discussed, it is understood that various modification will be apparent to those skilled in the art in view of the description herein. All such modifications are within the spirit and scope of the invention as encompassed by the following claims.

What is claimed is:

1. A non-transitory computer-readable medium on which is embedded one or more computer programs for providing network resource access functions within a software application, the one or more computer programs comprising computer readable code to:
   receive a request to perform a network resource access function, wherein the network resource access function provides access to one or more network device functions, wherein the network resource access function comprises a network traffic access service;
   determine, from a plurality of different types of devices, which of the plurality of different types of devices is to perform the network resource access function, wherein the plurality of different types of devices comprises at least a network traffic device;
   select a subset of the plurality of different types of devices, including the network traffic device, to perform the requested network access function;
   identify a plurality of actions to be performed by the selected subset of the plurality of different types of devices to satisfy the network resource access function; and
   issue a request that the selected subset of the plurality of different types of devices, including the network traffic device, perform the identified plurality of actions.

2. The non-transitory computer-readable medium of claim 1, the one or more computer programs further comprising computer readable code to:
   select the subset of the plurality of different types of devices from among a plurality of different types of devices and a plurality of technology servers to satisfy the requested network access function; and
   request that the selected subset of the plurality of different types of devices perform the identified plurality of actions to satisfy the network access function.

3. The non-transitory computer-readable medium of claim 2, wherein each of the technology servers is to issue an action request to one of the plurality of different types of devices in response to a technology-specific request.

4. The non-transitory computer-readable medium of claim 2, wherein the plurality of technology servers include a network traffic server and at least one technology server of at least one of the following types: voice services server, video resource server, and network attached storage server.

5. The non-transitory computer-readable medium of claim 4, wherein the plurality of technology servers include a network traffic server and technology servers of at least two of the following types: voice services server, video resource server, and network attached storage server.

6. The non-transitory computer-readable medium of claim 1, the one or more computer programs further comprising computer readable code to:
   identify a plurality of network services to be performed by the selected subset of the plurality of different types of devices of a network traffic access service and at least one of the following types: voice service, video resource service, and network attached storage service.

7. The non-transitory computer-readable medium of claim 1, the one or more computer programs further comprising computer readable code to:
   identify one or more network services to perform the requested network access function; and
   issue a plurality of network traffic access service requests to at least one network service server to perform the one or more network services on the network traffic device.

8. The non-transitory computer-readable medium of claim 7, the one or more computer programs further comprising computer readable code to:
   create an inter-service linkage between at least two of the plurality of network services.

9. A computer-implemented method comprising:
   (A) receiving a request to perform a network resource access function, wherein the network resource access function provides access to one or more network device functions, wherein the network resource access function comprises a network traffic access service;
   (B) determining, from a plurality of different types of devices, which of the plurality of different devices is to perform the network resource access function;
   (C) selecting a subset of the plurality of different types of devices, the plurality of different types of devices including a network traffic device and a device of at least one of the following types: voice services devices, video resource devices, and network attached storage devices;
   (D) identifying a plurality of actions to be performed by the device subset to satisfy the request; and
   (E) issuing requests to the device subset to perform the plurality of actions.

10. The method of claim 9, wherein the plurality of different types of devices further comprises at least two of the following types: voice services devices, video resource devices, and network attached storage devices.

11. The method of claim 9, wherein the subset further includes devices of at least one of the following types: voice services devices, video resource devices, and network attached storage devices.

12. The method of claim 9, wherein the subset further includes devices of at least two of the following types: voice services devices, video resource devices, and network attached storage devices.

13. The method of claim 9, further comprising:
   (F) before (C), selecting a subset of a first plurality of technology servers, the first plurality of technology servers providing network traffic monitoring services and at least one of the following types: voice services, video resource services, and network attached storage services;
   (G) providing at least one service request to the selected technology server subset; and wherein (D) and (E) are performed by the selected technology server subset.

14. The method of claim 9, wherein (C) comprises selecting the subset of the plurality of different types of devices based on locations of the plurality of different types of devices.

15. The method of claim 9, wherein (C) comprises selecting the subset of the plurality of different types of devices based on loads of the plurality of different types of devices.

16. The method of claim 9, wherein (C) comprises selecting the subset of the plurality of different types of devices based on operational states of the plurality of different types of devices.

17. An open network adapter comprising:
   one or more memories storing computer executable code for a network function translation application and at least one network service server, said network function translation application being to receive a request to perform a network resource access function, wherein the network access function is to provide access to one or more network device functions, wherein the network resource access function comprises a network traffic access service, said network function translation application being further to determine, from a plurality of different types of devices, which of the plurality of different types of devices is to perform the network resource action function, wherein the plurality of different types of devices comprises at least a network traffic device, to select a subset of the plurality of different types of devices, including the network traffic device, to perform the requested network access function, to issue a plurality of network service requests to the at least one network service server, said at least one network service server being to identify a plurality of actions to be performed by the selected subset of the plurality of different types of devices to satisfy the network access function, and to issue a request that the selected subset of the plurality of different types of devices, including the network traffic device, perform the identified plurality of actions; and
   at least one interface for interfacing the network function translation application and the at least one network service server.

18. The open network adapter of claim 17, wherein the one or more memories further comprise computer executable code for a plurality of technology servers to satisfy the requested network access function, wherein the network function translation application is to select a subset of the plurality of technology servers and wherein the at least one network service server is to request the selected subset of the plurality of technology servers to perform the identified plurality of actions.

19. The open network adapter of claim 17, wherein the subset includes network traffic monitoring devices of at least one of the following types of device: voice services devices, video resource devices, and network attached storage devices.

20. The non-transitory computer-readable medium of claim 1, wherein the network traffic device comprises at least one of a switch, a router, and an intrusion prevention system.

* * * * *